US008430298B2

(12) United States Patent
Martinez et al.

(10) Patent No.: US 8,430,298 B2
(45) Date of Patent: Apr. 30, 2013

(54) PRESENTATION INSTRUMENT PACKAGE ARRANGEMENT

(75) Inventors: Larry A. Martinez, Elkhorn, NE (US); Angelita I. Aquino, Denver, CO (US); Jennifer R. Cameron, Denver, CO (US); Adam L. Bowden, Franktown, CO (US)

(73) Assignee: The Western Union Company, Englewood, CO (US)

( * ) Notice: Subject to any disclaimer, the term of this patent is extended or adjusted under 35 U.S.C. 154(b) by 861 days.

(21) Appl. No.: 11/353,265

(22) Filed: Feb. 13, 2006

(65) Prior Publication Data

US 2007/0187488 A1 Aug. 16, 2007

(51) Int. Cl.

| | |
|---|---|
| ***G06F 17/00*** | (2006.01) |
| ***G06Q 40/00*** | (2012.01) |
| ***G06Q 30/00*** | (2012.01) |
| ***G07D 11/00*** | (2006.01) |
| ***G07F 19/00*** | (2006.01) |
| ***G06K 5/00*** | (2006.01) |
| ***G06K 7/00*** | (2006.01) |
| ***G06K 19/00*** | (2006.01) |
| ***G06K 19/06*** | (2006.01) |

(52) U.S. Cl.

USPC ........... 235/375; 235/379; 235/380; 235/435; 235/487; 235/486; 705/41; 705/14.3

(58) Field of Classification Search .................. 235/375, 235/435, 379, 380, 492, 493, 486, 487; 229/71; 705/14.3, 41; 206/459.5, 461

See application file for complete search history.

(56) References Cited

U.S. PATENT DOCUMENTS

| | | | | | |
|---|---|---|---|---|---|
| 4,445,635 | A | * | 5/1984 | Barr | 229/302 |
| 4,500,880 | A | * | 2/1985 | Gomersall et al. | 340/5.91 |
| 4,554,446 | A | * | 11/1985 | Murphy et al. | 235/487 |
| 4,829,168 | A | | 5/1989 | Nakahara | |
| 5,382,779 | A | * | 1/1995 | Gupta | 235/383 |
| 5,388,815 | A | * | 2/1995 | Hill et al. | 270/32 |
| 5,457,307 | A | * | 10/1995 | Dumont | 235/383 |
| 5,494,544 | A | * | 2/1996 | Hill et al. | 156/64 |
| 5,495,981 | A | * | 3/1996 | Warther | 229/71 |
| 5,513,117 | A | | 4/1996 | Small | |
| 5,659,163 | A | * | 8/1997 | Lagan et al. | 235/375 |
| 5,720,158 | A | | 2/1998 | Goade, Sr. | |
| 5,762,376 | A | * | 6/1998 | Taskett | 283/57 |
| 5,777,305 | A | * | 7/1998 | Smith et al. | 235/380 |
| D396,882 | S | | 8/1998 | Neal, Jr. | |
| 5,918,909 | A | * | 7/1999 | Fiala et al. | 283/61 |
| 5,921,584 | A | | 7/1999 | Goade, Sr. | |
| 6,014,650 | A | | 1/2000 | Zampese | |

(Continued)

FOREIGN PATENT DOCUMENTS

CA 2300241 A1 9/2000

OTHER PUBLICATIONS

PCT International Search Report mailed Sep. 10, 2008, International Application No. PCT/US08/63298, 9 pages.

*Primary Examiner* — Daniel Walsh

(74) *Attorney, Agent, or Firm* — Kilpatrick Townsend & Stockton LLP

(57) ABSTRACT

A presentation instrument package is constructed of a carrier having a package identifier. The package defines an enclosure into which is held a presentation instrument having a human readable presentation instrument identifier such that the human readable information is hidden from view.

17 Claims, 7 Drawing Sheets

U.S. PATENT DOCUMENTS

| | | | | |
|---|---|---|---|---|
| D429,733 | S | 8/2000 | Jones et al. | |
| D436,991 | S | 1/2001 | Morgante | |
| D457,556 | S | 5/2002 | Hochschild | |
| 6,439,613 | B2 * | 8/2002 | Klure | 283/62 |
| 6,471,127 | B2 | 10/2002 | Pentz et al. | |
| 6,543,809 | B1 | 4/2003 | Kistner et al. | |
| 6,588,658 | B1 | 7/2003 | Blank | |
| 6,764,002 | B1 * | 7/2004 | Zimmerman et al. | 235/383 |
| 7,063,255 | B2 * | 6/2006 | Algiene | 235/380 |
| 7,219,829 | B2 * | 5/2007 | Treat | 229/92.8 |
| 7,227,445 | B2 * | 6/2007 | Atkinson | 340/5.51 |
| 7,243,839 | B2 * | 7/2007 | Beck et al. | 235/380 |
| 7,370,805 | B2 * | 5/2008 | Smith et al. | 235/487 |
| 7,494,056 | B2 * | 2/2009 | Sturm | 235/380 |
| 7,533,814 | B2 * | 5/2009 | Martinez | 235/435 |
| 8,336,768 | B2 * | 12/2012 | Bulawa et al. | 235/379 |
| 2001/0005840 | A1 * | 6/2001 | Verkama | 705/67 |
| 2001/0032128 | A1 | 10/2001 | Kepecs | |
| 2001/0045738 | A1 * | 11/2001 | Klure | 283/61 |
| 2002/0027837 | A1 | 3/2002 | Weber | |
| 2002/0030102 | A1 * | 3/2002 | Brown | 235/435 |
| 2002/0088855 | A1 * | 7/2002 | Hodes | 235/385 |
| 2002/0100797 | A1 * | 8/2002 | Hollingsworth et al. | 229/92.8 |
| 2002/0185543 | A1 | 12/2002 | Pentz et al. | |
| 2002/0185855 | A1 * | 12/2002 | Klure | 283/62 |
| 2002/0188872 | A1 * | 12/2002 | Willeby | 713/202 |
| 2003/0001005 | A1 * | 1/2003 | Risafi et al. | 235/380 |
| 2003/0010824 | A1 * | 1/2003 | McQueen | 235/462.14 |
| 2003/0010829 | A1 | 1/2003 | Krygier | |
| 2003/0028439 | A1 * | 2/2003 | Cox et al. | 705/26 |
| 2003/0038175 | A1 * | 2/2003 | Welton | 235/380 |
| 2003/0066777 | A1 * | 4/2003 | Malone | 206/449 |
| 2003/0150141 | A1 * | 8/2003 | Waldron | 40/124.11 |
| 2003/0150142 | A1 * | 8/2003 | Street | 40/124.11 |
| 2003/0150762 | A1 * | 8/2003 | Biller | 206/461 |
| 2003/0194988 | A1 * | 10/2003 | Knox | 455/406 |
| 2004/0007618 | A1 * | 1/2004 | Oram et al. | 235/380 |
| 2004/0022542 | A1 * | 2/2004 | Atkinson | 398/115 |
| 2004/0114766 | A1 * | 6/2004 | Hileman et al. | 380/278 |
| 2004/0139318 | A1 | 7/2004 | Fiala et al. | |
| 2004/0146688 | A1 * | 7/2004 | Treat | 428/78 |
| 2004/0155101 | A1 * | 8/2004 | Royer et al. | 235/379 |
| 2004/0176666 | A1 * | 9/2004 | Chait | 600/300 |
| 2004/0182924 | A1 * | 9/2004 | VerEecke et al. | 235/385 |
| 2004/0261549 | A1 * | 12/2004 | Das et al. | 73/865.9 |
| 2005/0045732 | A1 * | 3/2005 | Whitaker | 235/493 |
| 2005/0061889 | A1 | 3/2005 | McGee et al. | |
| 2005/0086166 | A1 | 4/2005 | Monk et al. | |
| 2005/0116027 | A1 | 6/2005 | Algiene et al. | |
| 2005/0127169 | A1 | 6/2005 | Foss | |
| 2005/0205663 | A1 * | 9/2005 | Algiene | 235/380 |
| 2005/0242193 | A1 | 11/2005 | Smith et al. | |
| 2005/0247798 | A1 * | 11/2005 | Graves et al. | 235/493 |
| 2005/0279825 | A1 * | 12/2005 | Ashby et al. | 235/380 |
| 2006/0015402 | A1 | 1/2006 | Graves et al. | |
| 2006/0097042 | A1 * | 5/2006 | Kincaid | 235/383 |
| 2006/0131398 | A1 * | 6/2006 | Lewis et al. | 235/380 |
| 2006/0157556 | A1 * | 7/2006 | Halbur et al. | 235/380 |
| 2006/0198281 | A1 * | 9/2006 | Corley et al. | 369/273 |
| 2006/0213979 | A1 | 9/2006 | Geller et al. | |
| 2007/0000996 | A1 * | 1/2007 | Lambert et al. | 235/380 |
| 2007/0063021 | A1 * | 3/2007 | Chakiris et al. | 235/380 |
| 2007/0063052 | A1 * | 3/2007 | Chakiris et al. | 235/486 |
| 2007/0090184 | A1 * | 4/2007 | Lockwood et al. | 235/380 |
| 2007/0187488 | A1 * | 8/2007 | Martinez et al. | 235/380 |
| 2007/0187489 | A1 * | 8/2007 | Martinez | 235/380 |
| 2007/0200000 | A1 | 8/2007 | Sanders | |
| 2007/0251994 | A1 * | 11/2007 | Kingsborough et al. | 235/380 |
| 2007/0251995 | A1 * | 11/2007 | Kingsborough et al. | 235/380 |
| 2007/0252009 | A1 * | 11/2007 | Kingsborough et al. | 235/487 |
| 2007/0262160 | A1 * | 11/2007 | Narlinger et al. | 235/493 |
| 2008/0029596 | A1 * | 2/2008 | Nygaard et al. | 235/383 |
| 2008/0114696 | A1 * | 5/2008 | Singh et al. | 705/66 |
| 2008/0191460 | A1 * | 8/2008 | Blank | 283/72 |
| 2008/0217415 | A1 * | 9/2008 | Royer | 235/493 |
| 2008/0245857 | A1 * | 10/2008 | Lazarowicz et al. | 235/380 |
| 2009/0107862 | A1 * | 4/2009 | Pascua et al. | 206/232 |
| 2009/0134230 | A1 * | 5/2009 | Stojak et al. | 235/494 |
| 2009/0228364 | A1 | 9/2009 | Economy et al. | |
| 2010/0070290 | A1 * | 3/2010 | Marturana et al. | 705/1 |
| 2010/0106592 | A1 * | 4/2010 | Brown | 705/14.34 |
| 2012/0145578 | A1 * | 6/2012 | Pazlar et al. | 206/459.5 |

* cited by examiner

PRESENTATION INSTRUMENT PACKAGE ARRANGEMENT

CROSS REFERENCES TO RELATED APPLICATIONS

This application is related to and incorporates by reference U.S. patent application Ser. No. 11/746,521, filed on May 9, 2007 and entitled, "PRESENTATION INSTRUMENT WITH USER-CREATED PIN AND METHODS FOR ACTIVATING."

BACKGROUND OF THE INVENTION

The present invention generally relates to financial presentation instruments. More particularly, the present invention relates to methods and systems for producing, activating and redeeming financial presentation instruments, preferably stored value cards, gift cards, or other pre-paid debit cards.

Stored value cards, gift cards, or other pre-paid debit cards are well-known for providing access to goods and services. For example, stored value or gift cards may be purchased from various merchants such as Target®, Wal-Mart®, Starbucks®, Sears®, Blockbuster®, Macy's®, Banana Republic®, and the like. Pre-paid debit cards are also frequently purchased for telephone services. The purchase and usage of financial presentation instruments has continued to increase in recent years to the point that the sale of stored value cards, gift cards, and pre-paid debit cards today is a multi-billion dollar industry.

Initially, stored value cards, gift cards, and pre-paid debit cards were often printed and issued with a predetermined balance and typically then sold as a retail item. An example of such a card is a pre-paid gift card which provides an individual with a set dollar amount for the purchase of goods from a particular merchant. The account is accessed and debited by using an account identification number provided on the gift card. A problem experienced in the sale of such pre-paid gift cards is that merchants buying these cards are subsequently more exposed to loss through shrinkage and theft.

More recently, merchants have begun to display non-activated stored value cards, gift cards, and debit cards. In this way, the merchant can readily provide unfettered access of such cards to prospective customers since theft is much less of a concern. This is because the non-activated debit cards have no intrinsic value. Further, merchants no longer carry a large initial expenditure since the merchant activates the debit card with a balance representing an amount a customer wishes to attribute to the debit card at the time the debit card is actually purchased by the customer.

Typically, such non-activated stored value cards, gift cards, and debit cards are activated by a provider at a merchant location or retail store at the time of purchase. However, such cards may still be susceptible to certain types of fraud. Hence, for these and other reasons, there is a need for alternative methods and systems that provide for activation of financial presentation instruments, particularly stored value cards, gift cards, or other pre-paid debit cards.

BRIEF SUMMARY OF THE INVENTION

In one embodiment, the invention provides a method for activating a presentation instrument using a computerized network. The method utilizes a presentation instrument package that comprises a presentation instrument that is coupled to a carrier. A package identifier on the presentation instrument package is read and transmitted to a host computer system to indicate that the presentation instrument has been purchased. After being purchased, the presentation instrument may be removed from the carrier. To activate the presentation instrument, an access code and a presentation instrument identifier obtained from the presentation instrument may be provided to the host computer system. Also, the recipient may select a personal identifier to associate with the presentation instrument. The personal identifier may be transmitted to the host computer system for storage.

Optionally, the access code may be replaced by the personal identifier. In this way, the recipient may use the personal identifier when making purchases or when accessing account data at the host computer system.

In one aspect, the package identifier may comprise a UPC symbol and an account identifier. The UPC symbol may contain information such as a dollar amount for the presentation instrument, a fee associated with the presentation instrument and a type of presentation instrument. The package identifier may also include an account identifier that is associated with the presentation instrument identifier.

The host computer system may include a status indicator that is associated with the presentation instrument identifier. This status indicator may be set at pre-sold when the presentation instrument is produced, and then changed to sold when the host computer system receives the package identifier. However, the presentation instrument remains inactive and cannot be used to make purchases. After receiving the access code and the presentation instrument identifier from the card, the status may be changed from sold to active.

In one particular option, the merchant may be required to confirm receipt of payment prior to transmitting the identifier to the host computer system. In this way, the presentation instrument cannot be changed to the sold status until payment is received by the merchant.

In another option, the host computer system may be provided with information on a payment vehicle used to purchase the presentation instrument package. This information may be evaluated for fraudulent behavior. For example, the fraudulent behavior may be based on a number of times the payment vehicle was used during a certain time period or a number of presentation instrument packages purchased with the payment vehicle over a certain time.

One particular security feature is that the presentation instrument may be completely enclosed in the carrier. In this way, the presentation instrument identifier is not visible so that the presentation instrument must be removed from the carrier to obtain the presentation instrument identifier before being activated.

The method may also utilize an interactive voice response (IVR) system. This permits a recipient to activate the presentation instrument by providing information such as the access code, the presentation instrument identifier and the personal identifier to the IVR system.

To make a purchase with an activated presentation instrument, the presentation instrument may be presented at a point of sale (POS) device which reads the presentation instrument identifier. Also, the user may enter the personal identifier. The presentation instrument identifier received from the POS device may be evaluated to determine a status and decline the transaction if not yet purchased. Also, an expiration date associated with the presentation instrument may be evaluated at the host. A decline message may be sent if the expiration date is less than a certain time.

In another embodiment, the invention provides a computerized presentation instrument activation and processing system. The system includes a host computer system having at least one processor and at least one database having a record of presentation instrument identifiers and a status of each of the presentation instrument identifiers. The host computer system is configured to receive a package identifier indicating that a presentation instrument has been purchased and to flag the presentation instrument as sold. The host computer system is further configured to receive an access code, a presentation instrument identifier from a presentation instrument that has been purchased and a personal identifier. This information may be recorded in the database which may flag the presentation instrument as active.

The database may also include a record of UPC symbols containing information such as a dollar amount for the presentation instrument, a fee associated with the presentation instrument and a type of presentation instrument. In one aspect, the host computer system may further include an interactive voice response (IVR) unit that is configured to receive presentation instrument identifiers, access codes and personal identifiers.

In one particular aspect, the host computer system may be configured to receive information on a payment vehicle used to purchase a presentation instrument and to flag fraudulent behavior based on a number of times the payment vehicle was used during a certain time period or a number of presentation instrument packages purchased with the payment vehicle over a certain time.

In still a further embodiment, the invention provides a presentation instrument package that comprises a carrier having a package identifier that comprises UPC symbol and an account identifier. The package further includes a presentation instrument comprising a presentation instrument body and a human readable presentation instrument identifier on the body. The presentation instrument is coupled to the carrier so as to hide the presentation instrument identifier from human view.

The UPC symbol may contain information such as a dollar amount for the presentation instrument, a fee associated with the presentation instrument and a type of presentation instrument. The presentation instrument may further include a machine readable medium on the card body which includes the presentation instrument identifier.

DETAILED DESCRIPTION OF THE INVENTION

Figure 1:
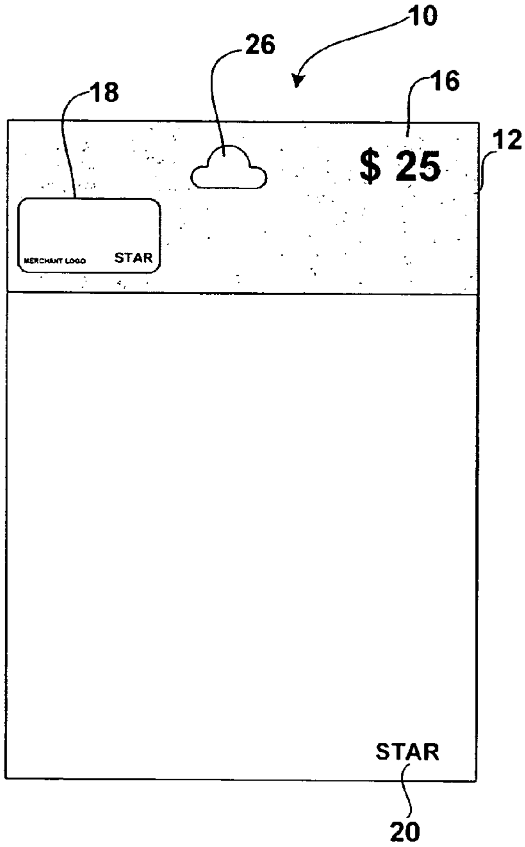
FIG. 1 is a front view of a presentation instrument package according to one embodiment of the invention.

In one embodiment, the invention encompasses pre-paid, PIN-debit general use presentation instruments, such as gift cards, accepted for goods and services at merchant/retail locations that have PIN-debit enabled POS devices. Cash withdrawals are also possible through conventional ATM's. Although primarily useful with PIN debits, such presentation instruments could also be used without a PIN. Further, in some cases, the presentation instruments may be non-reloadable, but in other cases could be configured to be reloadable. One particular advantage of such presentation instruments is that they may be marketed to consumers through existing retail locations as well as through various web sites.

The presentation instruments will generally comprise a stored value, gift, or other pre-paid debit card. This may include conventional debit cards and credit cards, e.g., ATM cards, bank cards, including those associated with VISA®, Mastercard®, American Express®, etc. In one embodiment, the presentation instruments may comprise a stored value card or a gift card that has an initial zero balance or a promotional value when mailed or provided to a merchant. In the case of the latter, it is important to note that even if the card is initially set to a promotional value, the card remains non-active. For example, the gift card may have a $5 initial promotional value that is activated upon loading of the card. The presentation instruments may be initialized to any desired amount a customer wishes to load or attribute onto the card. For example, the cards may be activated to a denomination of $5, $10, $15, $20, $50, $100, or any other desired denomination. The payment instrument may likewise comprise a debit card or credit card, similar to examples noted above, or alternatively an Automated Clearing House (ACH) authorization from a banking account, e.g., savings, checking, money market, etc.

The presentation instruments generally comprise a data card having an information storage medium. The information storage medium will generally comprise a magnetic stripe or barcode that is adapted to store a unique identifier so that the debit account may be properly accessed, activated, and/or debited. The information storage medium could also comprise radio frequency identification, computer chips, or other magnetic, radio frequency, or electronic storage media that may be readable by existing card reader technology, such as conventional point of sale (POS) terminals.

In some cases, the cards will have a card number and may be tracked through a separate account number at a host computer system. This scenario permits multiple cards to be tied to the same account. However, it will be appreciated that the card number and the account number could be the same number.

In one particular arrangement, the card number and the account number may be different and contain 16 characters so as to have the same format as traditional credit/debit cards. Also, in some cases, the card may have an expiration date, such as a two-year expiration date, that will expire the card but not necessarily the value associated with the card. If desired, the cards can also be set-up with a monthly maintenance fee that may optionally be waved for a certain time.

Communications between the host computer system and the various retailers may be accomplished through ISO, API or other electronic transaction processes, which can be customized for each retailer. When a consumer is ready to purchase a card, the consumer provides the card package at a check out station where the package is scanned using a point of sale device. After making payment, the resulting electronic issuance transaction is transmitted to a host computer system which will update the card status from pre-sold to pre-active (or sold) allowing the card to be subsequently activated through an IVR unit. In one particular aspect, the electronic issuance transaction will not be routed to the host computer system until the payment has been authorized/approved. In this way, the host computer system will not change the status of the card to pre-active until payment is actually received. As such, those incline to fraud will be unable to steal a card from a retail location and attempt to activate it without making payment.

Once the card is flagged as sold, the card still remains inactive until the consumer calls the IVR unit. This allows the user of the card to set his or her own PIN during the subsequent activation process.

One particular feature of the card package is that the package may include a barcode (or other machine readable code) that contains a SKU, an amount/indicator, and an account number that is tied to the card number. This permits the merchant to transmit to the host computer system information on a specific card package that was purchased, an amount of the card, a fee associated with the card and the account number.

Hence, the package may include a SKU to identify the product and an account number to associate the package with card included in the package. In one aspect, the SKU may be assigned for each denomination of the card, such as $25, $50, and $100. However, additional denominations could be included. Once the SKU is transmitted to the host computer system, IVR activation of the card will be enabled.

In one particular aspect, the information transmitted to the host computer system at the time of sale may include a payment indicator and payment card number field. This information is used to identify the payment vehicle used to purchase the gift card. In this way, various fraud parameters may be evaluated to test whether the purchase is for fraudulent purposes. For example, a query may be performed to determine if the payment vehicle has been used a maximum number of times, or if a dollar amount per payment source has been exceeded for a certain period. In this way, a fraud check may be performed to mitigate excessive activity and any risk associated with excessive use of a payment source. Other fraud protection measures include activation of card only after payment is received, use of a PIN in connection with the card, with the PIN being selected at the time of activation, and a J-hook package arrangement that securely encloses the card prior to purchase to hide the card number. In one aspect, the card may have the card number thermally printed instead of being embossed. This helps to prevent the possibility for retailers to use "knuckle buster" machines for processing unauthorized sales.

Another feature of such cards is that they may also be used in ATM machines, with functionalities like ATM withdrawals, ATM declines, ATM balance inquiry and the like.

In some cases, the cards may be provided with expiration dates. These dates may begin upon production of the card when the card is placed in the pre-sold status. In cases where significant time passes between the pre-sold status and the sold status, a check can be performed to ensure sufficient time remains on the card after purchase. For example, if the card is set to expire 24-month from the creation date, a check may be formed to make sure it still has 12 months left at the time of purchase. If not, the purchase may be declined and a new card may be purchased.

Upon production of the cards, various information is supplied to the database in the host computer system. This information may include the card number, the associated account number and a pre-sold status. As such, the card is inactive and can not be activated via the IVR until the package has been scanned through the POS at the time of purchase. When the card is purchased, it may be scanned through the POS and information is transmitted to the host computer system. If approved, the card status is updated to pre-active and may then be activated via the IVR. In one specific example, when the card is scanned, the POS system reads the barcode from the package and routes the electronic issuance transaction to the host computer system for an authorization response. The electronic issuance transaction message may be populated with the account number and a load amount that is translated from the UPC and the account number contained in the barcode. The transaction message may also be populated with a payment identifier, the payment source card number and a unique transaction identifier related specifically to the purchase. In the event the POS does not receive a response from the host computer system in a retailer-designated period of time, the POS may automatically re-send the issuance transaction. The transaction identifier may be checked to see if it has already been applied. If it has, the host computer system may return an authorization message to the POS. If the transaction has not been applied, a check of the card number is performed to see if the status is pre-sold. If it is not equal to pre-sold, an error message is returned to the POS indicating the card is not available for purchase. If the card is available for purchase, the funding is applied, the status is changed to from pre-sold to pre-active, and an authorization message is sent back to the POS to complete the transaction.

The expiration date may also be validated to ensure that the card does not expire in less than twelve months, or another specified time, from the date of purchase. In the event that the card being sold expiration date is less than twelve months from the purchase date, a decline message may be sent requiring that a new card be issued.

The authorization message may also include an approval code and may concatenate the account number, providing the last six digits included on the barcode. The card status is changed to pre-active so that is may be activated via the IVR. In some cases, a decline transaction may be sent in instances where the card is already active/sold (duplicate card production issues) or if the card is not related to the program.

To activate the card, the recipient may call the IVR unit where a PIN may be selected. The recipient may be required to provide the card number and an access code. The new PIN may replace the initial account access code. Upon activation, the account balance will be provided to the recipient. The IVR unit may provide returning users with account balance, transaction history, FAQ's, a list of retailers where the card can be used and access to customer service for lost and stolen card replacement and charge back service. Hence, when the caller enters the IVR system and successfully enters the PIN they created, the balance may immediately be provided.

The card system provides retailers with a number of advantages. For example, retailers have the ability to track sales results by channel, API (or other electronic transaction process)—instant issuance, web based purchases, and bulk orders. It also provides the ability to track sales by location:

The host computer system may also be used when producing the cards for the retailer. Processes involved in producing cards include embossing, thermal printing, encoding, packaging and distribution. Once cards have been produced, data that may be stored includes card numbers on the card, associated account numbers, expiration dates and barcode data on the package. The barcode data may include an 11 digit UPC and a 16-19 digit account number, with leading zeroes being used to keep the total digits at 19. The 11 digit UPC may include a product identifier and an amount indicator. The UPC may also be used to identify the service fee associated with the card denomination sold. The account number is tied to the card number included in the package.

Figure 2:
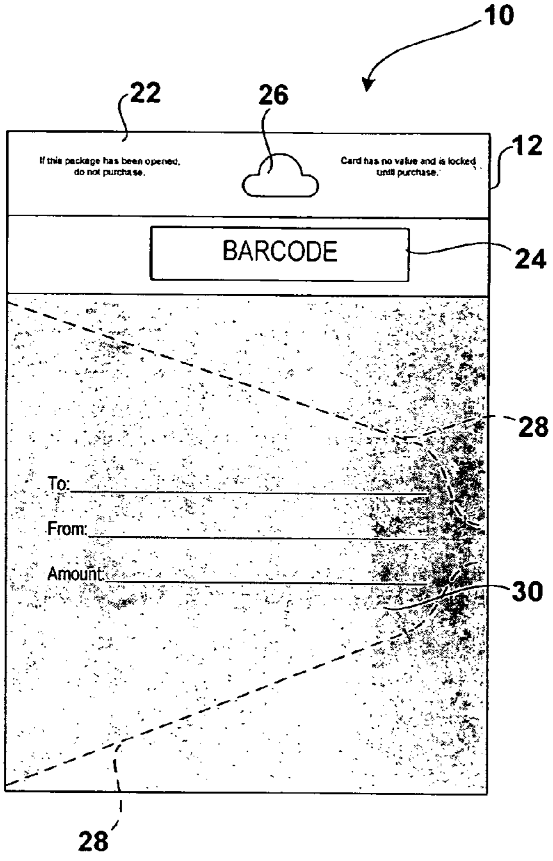
FIG. 2 is a rear view of the package of FIG. 1.

Referring now to FIGS. 1 and 2, one embodiment of a presentation instrument package 10 will be described. Package 10 comprises a carrier 12 and a presentation instrument 14 (see FIG. 3) enclosed within the carrier 12. Carrier 12 may be constructed of a wide variety of materials, such as card stock, paper, plastic and the like and includes an external surface where various materials can be printed. For example, such information may include a denomination 16 a picture 18 of a presentation instrument, a logo 20 as well as other advertising information, terms and conditions and the like. As shown in FIG. 2, the other side may include various instructions 22 or other terms and conditions. Also, carrier 12 includes a barcode 24 that is used to identify package 10 at a time of purchase. Information including in barcode 24 may include a SKU number, an activation amount for the presentation instrument, a fee charged at the point of purchase and the type of presentation instrument. Barcode 24 may also include an account identifier associated with an account tied to the presentation instrument. Use of barcode 24 permits a wide variety of information to be transmitted to a host at the time of purchase.

Figure 3:
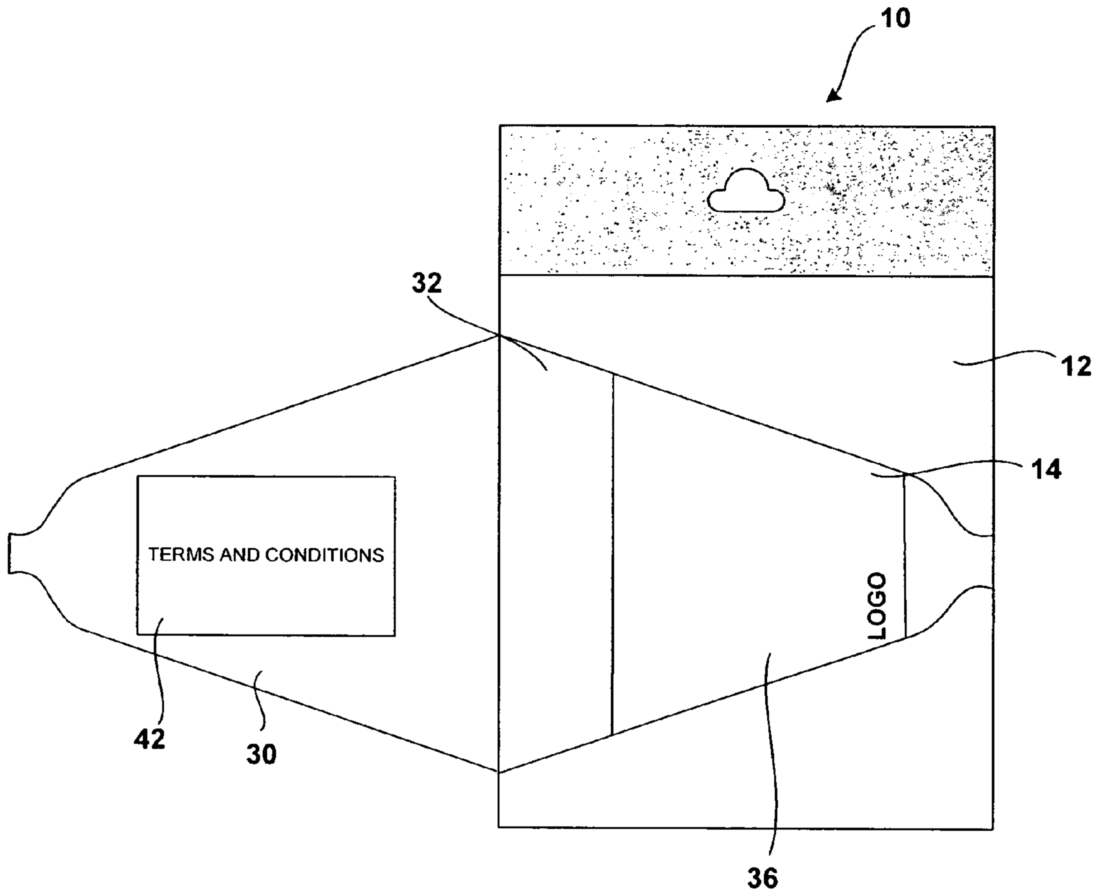
FIG. 3 illustrates the package of FIG. 2 with a panel opened to expose a presentation instrument.

Carrier 12 may also include an aperture 26 that allows package 10 to be displayed in a hanging position, such as from a J-hook. Carrier 12 may also include score lines 28 that permit a flap 30 (see FIG. 3) to be pulled off and folded open. As best illustrated in FIG. 3, carrier 12 may be constructed of a piece of material that is folded over on itself (or between two separate pieces of material) so as to fully enclose presentation instrument 14. When flap 30 is opened, a window 32 is created to reveal and provide access to presentation instrument 14. In one embodiment, presentation instrument 14 is fully enclosed in carrier 12 to prevent any visual access until flap 30 is opened. In this way, any identifying information on presentation instrument 12 is not accessible until package 10 is purchased. If flap 30 is opened prior to sale, the merchant may be instructed not to sell it.

In one particular orientation, presentation instrument 14 may be placed in carrier 12 so that front side 36 faces the user when flap 30 is opened. The rear side 40 (see FIG. 5) is against carrier 12 and cannot be viewed until presentation instrument 14 is removed. Also, when opened, a booklet 42 of terms and conditions attached to flap 30 is exposed. Booklet 42 may be opened and/or removed from flap 30.

After presentation instrument 14 is exposed (after being purchased), it may be pulled from carrier 12 out through window 32 and activated. In order to activate presentation instrument 14, various information provided on presentation instrument 14 must be provided to an activation system. Also, before activation can occur, package 10 must be purchased, with purchase information from package 10 being sent to a host. Hence, even if package 10 is stolen, it cannot be activated without proof that payment was received. Further, once activated, the user can create his or her own PIN so that presentation instrument 14 cannot be used without the PIN.

Figure 4:
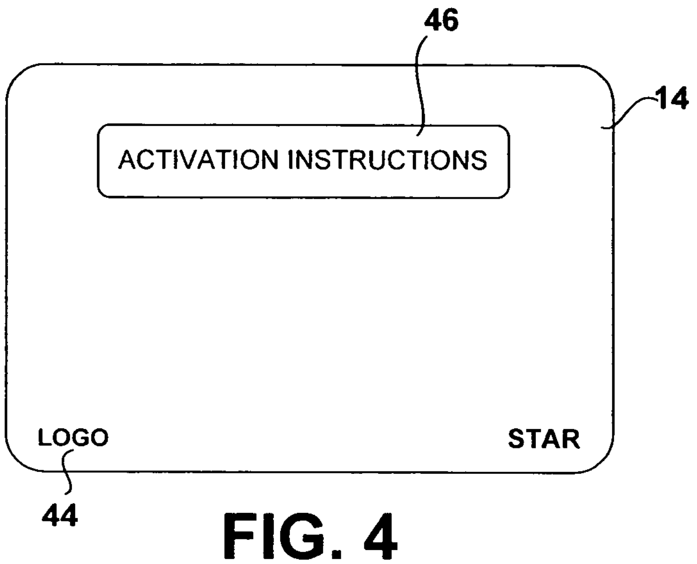
FIG. 4 is a front view of the presentation instrument embodied in the package of FIG. 1.

As best sown in FIG. 4, front side 36 of presentation instrument 14 may include a merchant logo 44 or other identifying advertising information, such as where presentation instrument 14 may be used. A sticker 46 may also be placed on presentation instrument 14 with instructions for activating presentation instrument 14 following purchase. Sticker 46 may be peeled off prior to using presentation instrument 14.

Figure 5:
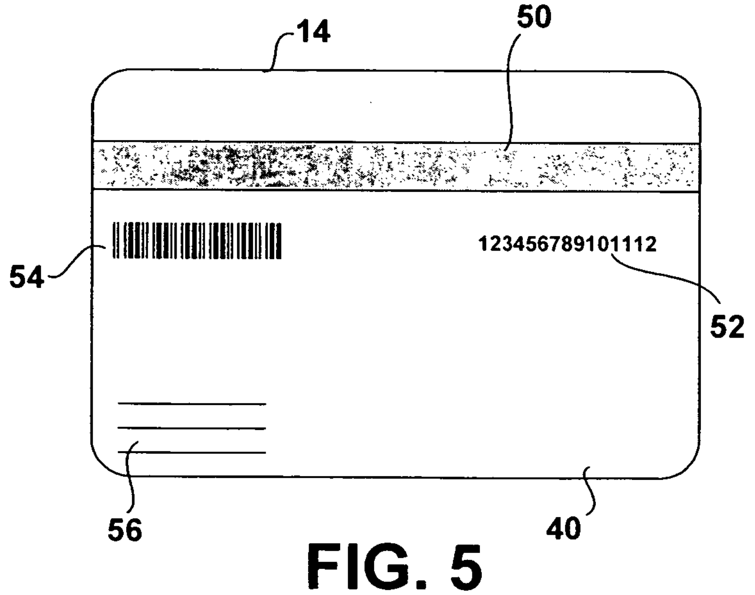
FIG. 5 is a rear view of the presentation instrument of FIG. 4.

FIG. 5 illustrates rear side 40 of presentation instrument 14 which may be constructed of generally rigid material, such as plastic, card stock, or the like. Disposed across presentation instrument 14 is a magnetic stripe 50 which may have recorded thereon various information, such as a presentation instrument identifier, sometimes referred to as a card number. A human readable card number 52 may also be printed onto presentation instrument 14. Also provided on presentation instrument 14 is a barcode 54 that may also have the presentation instrument identifier. In some cases, presentation instrument 14 may include only magnetic stripe 50, only barcode 54 or sometimes both. Presentation instrument 14 may also include an access code which could be the last 6 digits of the card number. The access code may be used to ensure the user properly input the card number during activation. Presentation instrument 14 can also include various terms and conditions 56.

Figure 6:
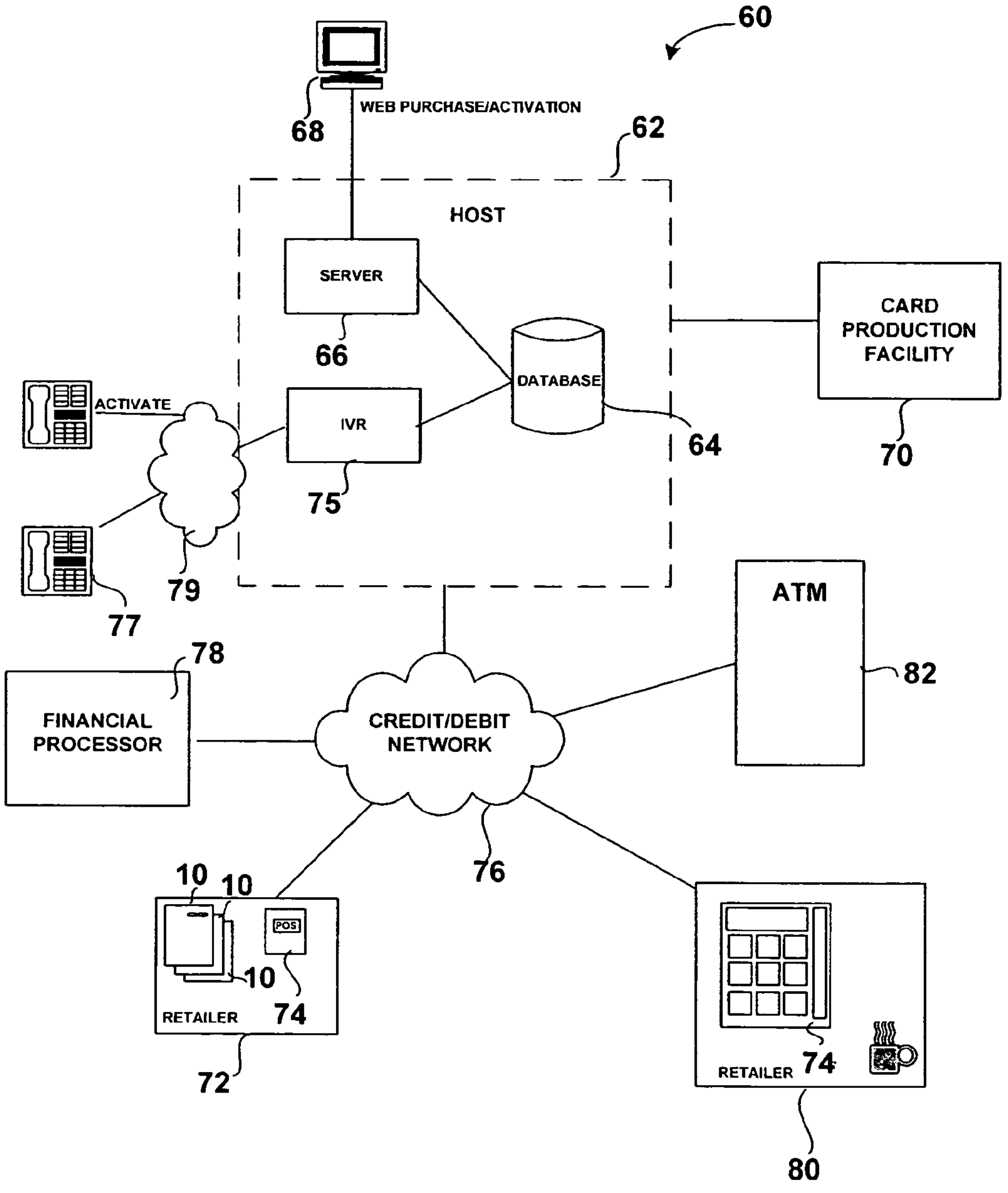
FIG. 6 is a schematic view of a presentation instrument activation and processing system according to the invention.

Referring now to FIG. 6, one embodiment of a presentation instrument activation and processing system 60 will be described. Central to system 60 is a host computer system 62 which includes a database 64 which stores and processes various information, such as account numbers, card numbers, SKU numbers, activation amounts, existing balances, fees, merchant location identifiers and the like. Host system 62 also includes various inputs and outputs that permit host system 62 to communicate with various other systems over a variety of networks which may use different protocols. For example, host system 62 may include a server computer 66 that permits an ordering computer 68 to order cards over a network, such as the Internet, a private network or the like. These cards may be ordered by individual purchasers or in bulk by retailers, an example of which is described in copending U.S. patent application Ser. No. 10/789,455, filed Feb. 26, 2004, incorporated herein by reference. Once cards have been ordered, they may be produced and packaged at a card production facility 70, then sent to individual recipients or to merchant locations, such as at retailer 72. As shown, retailer 72 includes multiple presentation instrument packages 10 which are displayed at a point of sale.

As is known in the art, retail locations include POS devices 74 that accept payment instruments, examples of which are described in U.S. Pat. No. 6,886,742, incorporated by reference. POS devices 74 are used to transmit data from payment vehicles over a credit/debit network 76 to a financial processor 78 which authorizes and facilitates credit/debit payments with various financial institutions.

When purchasing a presentation instrument 10, the purchaser provides payment by cash, check, credit or debit card. If needed, POS device 74 reads the payment vehicle which transmits the data to financial processor 78 for authorization. If payment is approved, the package identifier on package 10 is read by POS device and transmitted to host 62 which uses database 64 to ensure the card is valid and records the purchase in database 64, changing the status of the card from pre-sold to pre-active. A transmission is sent back to POS device for printing a receipt. In some cases, it will be appreciated that processor 78 and host 62 could be the same system. Host 62 may also be used to perform various fraud checks to ensure a stolen card is not being used to purchase package 10.

Once purchased, package 10 may be opened and presentation instrument 14 removed. To activate presentation instrument 14, the user contacts an IVR system 75 using a phone 77 over a telecommunications network 79. IVR system 75 asks the user to key in or speak the card number and an access code (which could be the last few digits of the card number). If entered correctly, host 62 places the presentation instrument 14 in an active state. Also, the user is given the opportunity to create a PIN that may be used in future purchases, when accessing IVR system 75 for account information or over the Internet when obtaining account information. As one specific example, a card holder may have the ability to access a web site, login and obtain account balance information, account activity and similar information. To do so, the presentation instrument may also include a three digit security code, which may conveniently be the last three digits of the account number on the bar code. This three digit number could be printed on the presentation instrument and used as a security code. When the card holder accesses the web site, the card holder may be asked to enter the card number as well as the security code.

A user may then visit a retailer 80 to make a purchase, using presentation instrument 14 for payment. POS device 74 may be used to read the card number off the magnetic stripe or car code. Also, the user may enter a PIN. This data is transmitted over network 76 to host 62 which processes the card number and PIN and debits the account by the purchase price. A confirmation is sent back to POS device 74 to print a receipt which may include the account balance.

Presentation instrument 14 can also be used to perform transactions using an ATM machine 82 as is known in the art. The PIN may be used as a measure of security. The transaction may be processed by host 62 in a manner similar to a purchase.

Figure 7:
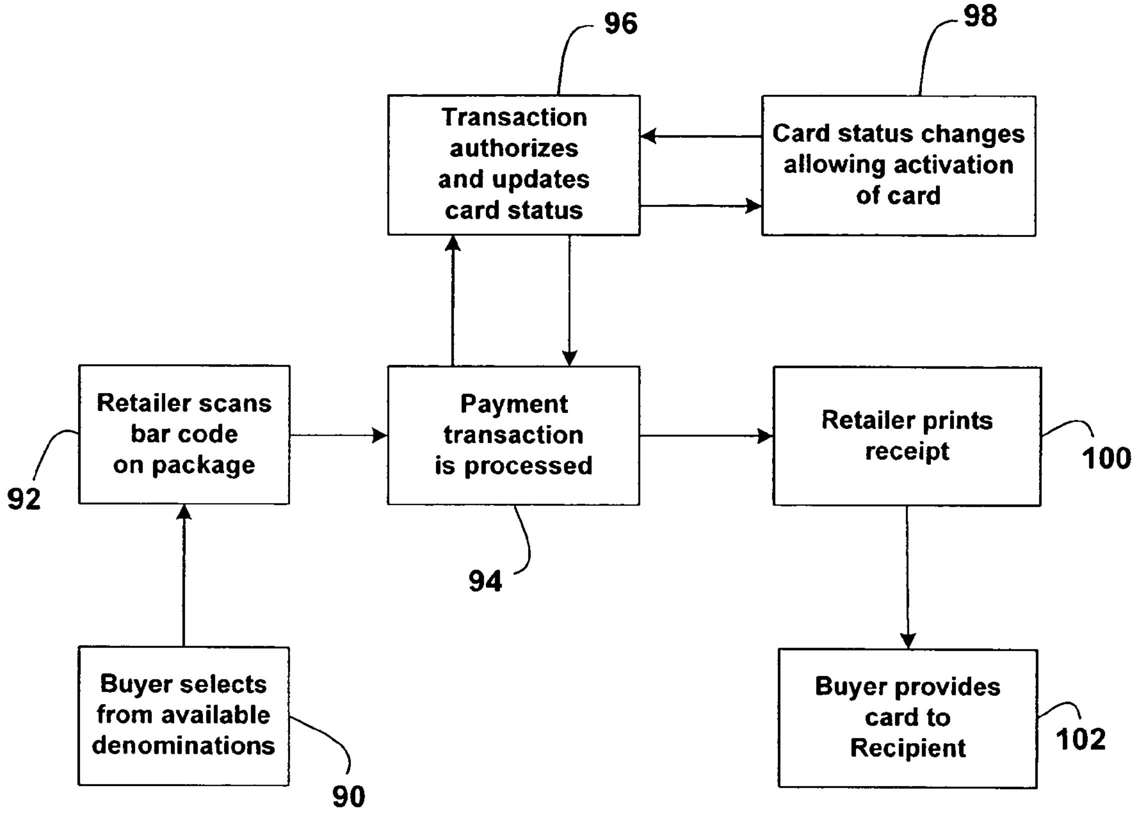
FIG. 7 is a flow chart of one method for activating a presentation instrument according to the invention.

Referring now to FIG. 7, one method for purchasing a presentation instrument will be described. Initially the purchaser selects a presentation instrument for purchase. Conveniently, the presentation instrument may be in various denominations and the buyer may select a particular denomination (step 90). The presentation instrument may be displayed on a J-hook near a point of purchase. At this point, the presentation instrument is in an inactive state and flagged as pre-sold. At the check-out counter, a POS device is used to read a barcode on the package (step 92). In step 94, payment is tendered by the buyer and the payment transaction is processed. In some cases, payment from the buyer will need to be confirmed before the information scanned from the barcode is transmitted to a host computer. Payment may be by cash, credit card, debit card or the like. By receiving payment first, the status of the presentation instrument cannot be changed at the host until receipt of payment is acknowledged. In this way, the presentation instrument may not be stolen and then activated.

If a payment vehicle is used to purchase the presentation instrument, information on the payment vehicle may be transmitted to the host computer to see if this payment vehicle has been used too many times or too often when purchasing other presentation instruments. Such conditions may be indicative of fraud.

Authorization of the transaction occurs at step 96. Included in the barcode read from the package can include information such as a SKU number, the account number associated with the presentation instrument, an associated denomination, a fee and the like. This information is transmitted to the host which processes the data. If all is in order, the status of the presentation instrument may be changed from a pre-sold status to a sold status. However, the presentation instrument still is not active.

A confirmation of the purchase is transmitted back to the POS device, permitting the retailer to print a receipt (step 100). The buyer may then present the presentation instrument to a recipient (step 102) who may subsequently activate the presentation instrument.

Figure 8:
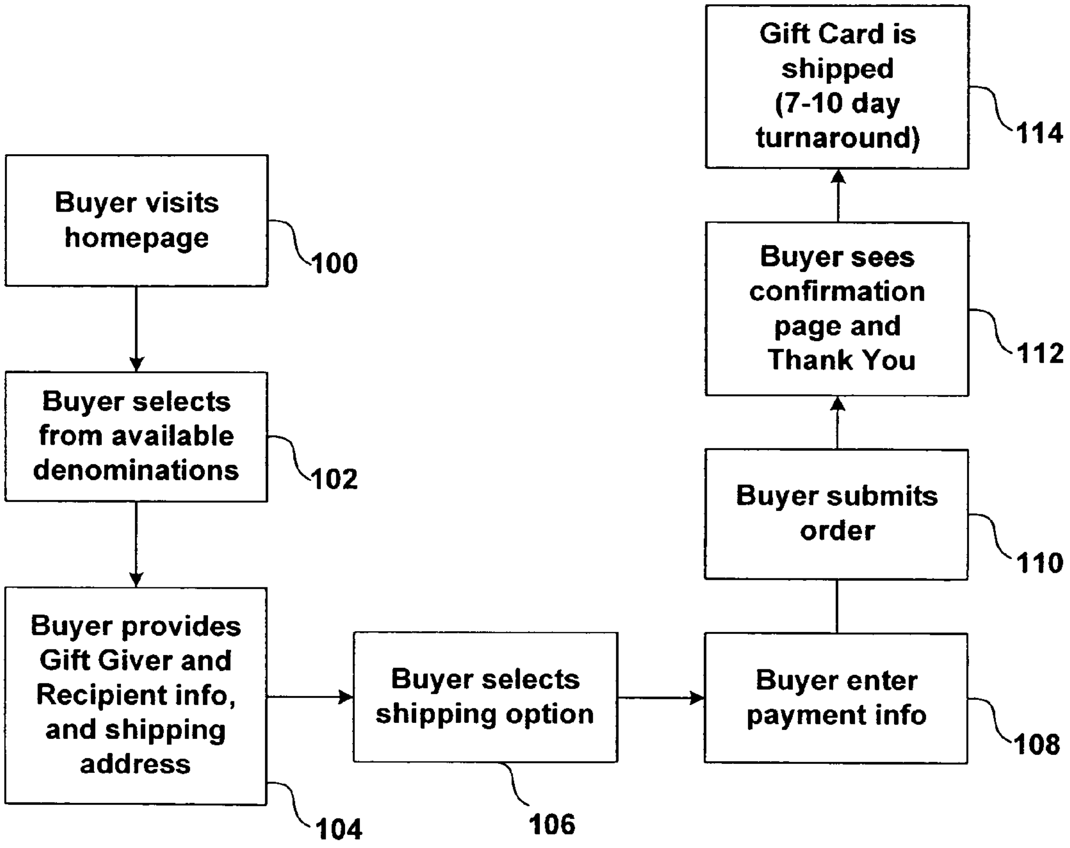
FIG. 8 is a flow chart of one method for the on-line purchasing and activating a presentation instrument according to the invention.

The techniques of the invention may also be used when purchasing presentation instruments over the Internet. As illustrated in FIG. 8, the buyer accesses a website home page as illustrated in step 100. The buyer may be shown various presentation instruments with different denominations. The buyer selects one for purchase as shown in step 102. The buyer may also provide information on himself and recipient information as well as a shipping address (step 104). The buyer may select a shipping option (step 106), such as regular mail, overnight mail or the like. As shown in step 108, the buyer enters payment information including a payment vehicle. In step 110, the buyer submits the order. Various fraud checks may be performed as with other embodiments. If the order is confirmed, a confirmation is presented on the buyer's computer screen (step 112). The presentation instrument is then shipped to the recipient as shown in step 114.

Figure 9:
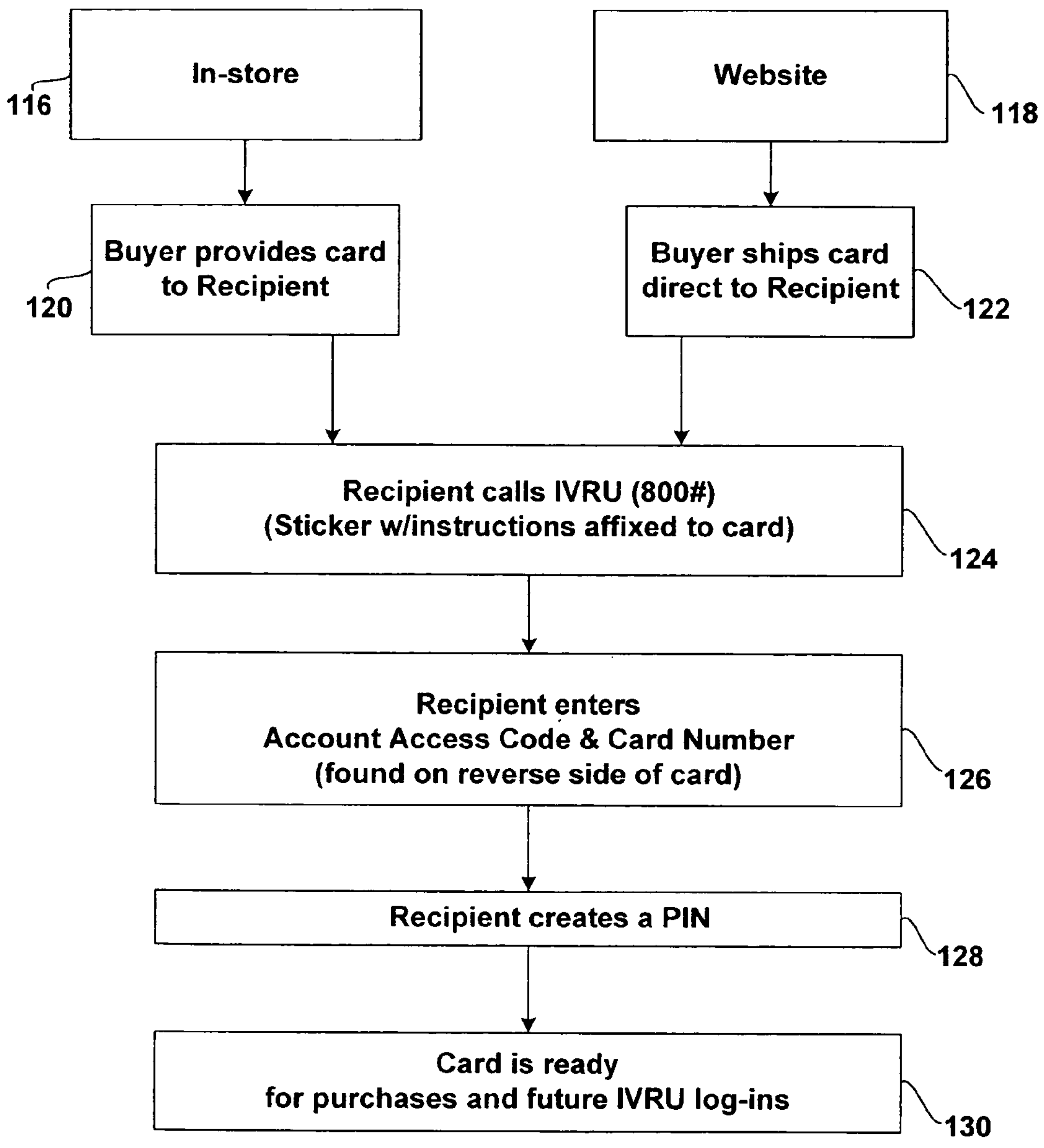
FIG. 9 is a flow chart of one method for activating a presentation instrument according to the invention.

FIG. 9 illustrates one method for activating a presentation instrument, as purchased at a retail location (step 116) or on-line (step 118). When purchased in-store as described in FIG. 7, the buyer provides the presentation instrument to the recipient as shown in step 120. If purchased on-line, the presentation instrument is shipped directly to the recipient as shown in step 122.

Once the recipient has the presentation instrument, it is removed from the carrier and the presentation instrument identifier is located. The recipient calls an IVR unit using any type of phone as shown in step 124. Conveniently, the presentation instrument may include a removable sticker with the phone number and calling/activation instructions. The recipient is asked by the IVR unit to enter the presentation instrument identifier and the access code which may be found on the back of the card as set forth in step 126. In some cases, the access code can be the last several digits of the presentation instrument identifier to ensure it is entered correctly.

In step 128, the recipient is guided through a process for creating a PIN. This PIN may replace the access code and be used when making PIN debits as well as accessing the IVR unit or website to obtain account information as shown in step 130.

The invention has now been described in detail for purposes of clarity and understanding. However, it will be appreciated that certain changes and modifications may be practiced within the scope of the appended claims.

What is claimed is:

1. A presentation instrument package comprising:

a carrier having a package identifier, the package identifier comprising a barcode, and the barcode comprising an account identifier, a SKU number, a service fee charged at the point of purchase, and an activation amount representing a value attributable to an account associated with the account identifier, wherein the barcode is readable by a point of sale device to permit the account identifier, the SKU number and the activation amount to be transmitted, at the time of purchase of the presentation instrument at the point of sale device, along with confirmation of payment for the presentation instrument, to a host computer to place the account associated with the account identifier in a sold status; and a presentation instrument comprising a presentation instrument body and a human readable presentation instrument identifier and an access code on the body, wherein the presentation instrument further includes a peel-off sticker removably coupled to the presentation instrument body, wherein the peel-off sticker includes instructions for activating the account associated with the account identifier by providing the presentation instrument identifier and the access code to the host computer, wherein the account associated with the account identifier is activated upon providing the presentation instrument identifier and access code to the host computer only if the account has been earlier placed in the sold status, and wherein the presentation instrument further includes a machine readable medium on the card body which includes the presentation instrument identifier;

wherein the presentation instrument is coupled to the carrier so as to hide the presentation instrument identifier from human view; and wherein the presentation instrument is usable to make purchases by reading the presentation instrument identifier from the machine readable medium on the card body after the account has been both placed into the sold status and activated at the host computer using the presentation instrument identifier and the access code.

2. A package as in claim 1, wherein the barcode further comprises a UPC symbol, the UPC symbol including information selected from a group consisting of a dollar amount for the presentation instrument and a fee associated with the presentation instrument.

3. A package as in claim 2, wherein the machine readable medium comprises at least one of a barcode and a magnetic stripe having the presentation instrument identifier.

4. A package as in claim 1, wherein the human readable presentation instrument identifier is thermally printed on the body.

5. A package as in claim 1, wherein the carrier comprises at least one piece of a paper product.

6. A package as in claim 1, wherein the carrier defines an enclosure, and wherein the presentation instrument is disposed in the enclosure so as to be fully enclosed by the carrier.

7. A package as in claim 6, wherein the carrier further includes a flap formed by score lines that is openable by tearing the flap along the score lines to reveal at least a portion of the presentation instrument, and further comprising a set of terms and conditions that are coupled to an inner side of the flap such that the entire sheet of terms and conditions are coupled to the flap so as to be adjacent the presentation instrument when the flap is closed and so as to be entirely accessible for removal from the flap when the flap is opened.

8. A package as in claim 1, wherein the carrier includes an aperture to permit the carrier to be hung from a hook.

9. A package as in claim 1, wherein the carrier includes a personalization region where sender or recipient information may be written.

10. A presentation instrument package, comprising:

a carrier having a package identifier, the package identifier comprising one piece of machine readable data that includes a UPC symbol encoded to include an account identifier, a SKU number, an activation amount, and a separate service fee, wherein the carrier further defines an enclosure and an openable flap defined by score lines to provide access into the interior;

a presentation instrument comprising a presentation instrument body and a human readable presentation instrument identifier on the body and an access code, wherein the presentation instrument further includes a peel-off sticker removably coupled to the presentation instrument body, wherein the peel-off sticker includes instructions to use the presentation instrument identifier and access code for activating an account associated with the account identifier, and wherein the access code comprises a portion of the presentation instrument identifier and ensures proper input of the presentation instrument identifier during activation;

a sheet of terms and conditions coupled to an inner surface of the flap such that the entire sheet of terms and conditions are coupled to the flap so as to be adjacent to the presentation instrument when the flap is closed and so as to be entirely accessible for removal from the flap when the flap is opened;

wherein the presentation instrument is held within the enclosure so as to hide the presentation instrument identifier from human view.

11. A package as in claim 10, wherein the carrier comprises adjacent portions of card stock that define the enclosure.

12. A package as in claim 10, wherein the presentation instrument further includes a machine readable medium on the card body which includes the presentation instrument identifier.

13. A package as in claim 12, wherein the machine readable medium comprises at least one of a barcode and a magnetic stripe having the presentation instrument identifier.

14. A package as in claim 10, wherein the presentation instrument body comprises a rectangular piece of plastic.

15. A presentation instrument package comprising:

a carrier having a package identifier that comprises a machine readable symbol; and a presentation instrument comprising a presentation instrument body and a human readable presentation instrument identifier and a human readable access code on the body, wherein the presentation instrument further includes a machine readable medium on the body which includes the presentation instrument identifier;

wherein:

the presentation instrument is coupled to the carrier so as to hide the presentation instrument identifier from human view; and the machine readable symbol contains a product code, a service fee charged to purchase the presentation instrument, an activation amount representing a value attributable to the presentation instrument, and an account identifier, wherein the machine readable symbol is readable by a point of sale device to permit the account identifier, the activation amount and the product code to be transmitted to a host computer, along with confirmation of payment for the presentation instrument, to place an account associated with the account identifier in an sold state; and the account identifier is associated with the presentation instrument identifier in a database such that the presentation instrument identifier can be determined from the account identifier;

wherein the presentation instrument further includes a peel-off sticker removably coupled to the presentation instrument body, wherein the peel-off sticker includes instructions for activating the account associated with the account identifier by providing the presentation instrument identifier and the access code to the host computer;

wherein the access code comprises a portion of the presentation instrument identifier;

wherein providing the access code ensures proper input of the presentation instrument identifier during activation; and wherein the presentation instrument is usable to make purchases by reading the presentation instrument identifier from the machine readable medium on the card body only after the account has been both placed into the sold status and activated at the host computer using the presentation instrument identifier and the access code.

16. A presentation instrument package as in claim 15, wherein the product code is a SKU number.

17. A presentation instrument package as in claim 15, wherein the product code is a UPC symbol.

* * * * *